(12) United States Patent
Shu et al.

(10) Patent No.: US 9,784,615 B1
(45) Date of Patent: Oct. 10, 2017

(54) ADJUSTMENT FOR IRREGULAR SENSOR MOVEMENT DURING SPECTRAL IMAGING

(71) Applicant: BaySpec, Inc., San Jose, CA (US)

(72) Inventors: Guocai Shu, Pleasanton, CA (US); Shu Zhang, Fremont, CA (US); William Yang, Fremont, CA (US)

(73) Assignee: BaySpec, Inc., San Jose, CA (US)

( * ) Notice: Subject to any disclaimer, the term of this patent is extended or adjusted under 35 U.S.C. 154(b) by 0 days.

(21) Appl. No.: 15/362,108

(22) Filed: Nov. 28, 2016

Related U.S. Application Data

(63) Continuation-in-part of application No. 15/294,435, filed on Oct. 14, 2016.

(51) Int. Cl.
*G01J 3/02* (2006.01)
*G01J 3/28* (2006.01)

(52) U.S. Cl.
CPC .......... *G01J 3/0289* (2013.01); *G01J 3/2823* (2013.01); *G01J 2003/283* (2013.01)

(58) Field of Classification Search
CPC ........ G01J 3/02; G01J 3/26; G01J 3/28; G01J 3/18
See application file for complete search history.

(56) References Cited

U.S. PATENT DOCUMENTS 5,467,271 A * 11/1995 Abel .................... A01B 79/005
702/5

* cited by examiner

*Primary Examiner* — Abdullahi Nur
(74) *Attorney, Agent, or Firm* — Carr & Ferrell LLP

(57) ABSTRACT

Systems for adjusting for irregular movement during spectral imaging are provided herein. Exemplary systems include: a spectrograph measuring a plurality of spectrographic data sets; a camera capturing images, a processor communicatively coupled to the spectrograph and the camera; and a memory coupled to the processor, the memory storing instructions executable by the processor to perform a method comprising: receiving a plurality of spectrographs for a series of respective locations and the images corresponding to the respective locations; generating a continuous image using the images; identifying a respective corresponding position in the continuous image for each spectrograph, such that each spectrograph is a measurement of the respective position; and associating each spectrograph with the respective position.

20 Claims, 12 Drawing Sheets

ADJUSTMENT FOR IRREGULAR SENSOR MOVEMENT DURING SPECTRAL IMAGING

CROSS-REFERENCE TO RELATED APPLICATIONS

This Application is a continuation in part of U.S. patent application Ser. No. 15/294,435, filed Oct. 14, 2016, the disclosure of which is hereby incorporated by reference for all purposes.

TECHNICAL FIELD

The present technology relates generally to spectral imaging, and more specifically to three-dimensional spectroscopy.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Spectroscopy (or spectrography) refers to techniques that employ radiation in order to obtain data on the structure and properties of matter. Spectroscopy involves measuring and interpreting spectra that arise from the interaction of electromagnetic radiation (e.g., a form of energy propagated in the form of electromagnetic waves) with matter. Spectroscopy is concerned with the absorption, emission, or scattering of electromagnetic radiation by atoms or molecules.

Spectroscopy can include shining a beam of electromagnetic radiation onto a desired sample in order to observe how it responds to such stimulus. The response can be recorded as a function of radiation wavelength, and a plot of such responses can represent a spectrum. The energy of light (e.g., from low-energy radio waves to high-energy gamma-rays) can result in producing a spectrum.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems for compensating for irregular motion in three-dimensional spectroscopy. Specifically, a system for adjusting for irregular movement during spectral imaging may comprise: a spectrograph measuring a plurality of spectrographic data sets; a camera capturing images, the camera being coupled to the spectrograph such that the spectrograph and the camera move in tandem and at least partially share the same point of view, the spectrograph and the camera being synchronized; a processor communicatively coupled to the spectrograph and the camera; and a memory coupled to the processor, the memory storing instructions executable by the processor to perform a method. The method may comprise: receiving the plurality of spectrographic data sets for a series of respective locations and the images corresponding to the respective locations, each of the plurality of spectrographic data sets being measured by the spectrograph and each of the corresponding images being captured by the camera at substantially the same time; generating a continuous image using the received images; identifying a respective corresponding position in the continuous image for each spectrographic data set, such that each spectrographic data set is a measurement of the respective position; and associating each spectrographic data set with the respective position.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1A:
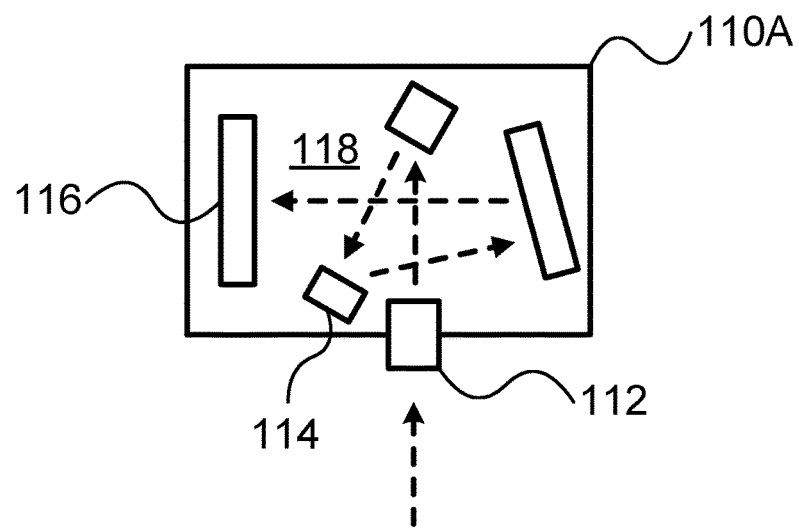
FIG. 1A is a simplified representation of a system for three-dimensional spectroscopy, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1A illustrates system 100 for spectral imaging. System 100 includes spectrometer 110A and object 120A. To create a three-dimensional spectrograph of object 120A, object 120A moves at a predetermined rate and direction 130 in a two-dimensional plane (e.g., on a conveyer). Spectrometer 110A can receive light, break the light into its spectral components, and digitize the signal as a function of wavelength. In some embodiments, spectrometer 110A includes slit 112, spectral dispersion element 114, and detector 116. By way of non-limiting example, spectrometer 110A measures wavelengths in such ranges as the visible spectrum (e.g., 380 nm-760 nm), visible to near-infrared (e.g., 400 nm-1000 nm), short-wave infrared (e.g., 950 nm-1700 nm), and infrared (e.g., 1 µm-5 µm).

Slit 112 can determine the amount of light (e.g., photon flux) that enters optical bench 118. Dimensions (e.g., height and width, not shown in FIG. 1A) of slit 112 can determine the spectral resolution of spectrometer 110A. By way of non-limiting example, a height of slit 112 can range from 1 mm to 20 mm. By way of further non-limiting example, a width of slit 112 can range from 5 µm to 800 µm.

Spectral dispersion element 114 can determine a wavelength range of spectrometer 110A and can partially determine an optical resolution of spectrometer 110A. For example, spectral dispersion element 114 is a ruled diffraction grating or a holographic diffraction grating, in the form of a reflective or transmission package. Spectral dispersion element 114 can include a groove frequency and a blaze angle.

Detector 116 receives light and measures the spectral components of the light. Detector 116 can be a one- or two-dimensional detector array comprised of a semiconductor material such as silicon (Si) and indium gallium arsenide (InGaAs). In some embodiments, a bandgap energy of the semiconductor determines an upper wavelength limit of detector 116. An array of detector 116 can be in different configurations, such as charged coupled devices (CCDs), back-thinned charge coupled devices (BT-CCDs), complementary metal-oxide-semiconductor (CMOS) devices, and photodiode arrays (PDAs).

Optical bench 118 of spectrometer 110A includes slit 112, spectral dispersion element 114, detector 116, and various optical elements (not shown in FIG. 1A). Slit 112, spectral dispersion element 114, and detector 116 can be arranged in optical bench 118, along with other components (e.g., one or more mirrors), according to different configurations. For example, different configurations include: crossed Czerny-Turner, unfolded Czerny-Turner, transmission, and concave holographic optical benches.

In various embodiments, a computing system (not shown in FIG. 1A) receives measurements (e.g., spectrographic data set) from detector 116, digitizes the measurements, and produces a spectrograph. For example, spectrometer 110A produces a spectrographic data set of object 120A, taken as object 120A moves at a predetermined rate and direction 130 in a two-dimensional plane. The spectrographic data set can be used to produce a series of spectrographs (the resulting series of spectrographs referred to as a three-dimensional spectrograph).

Figure 1A:
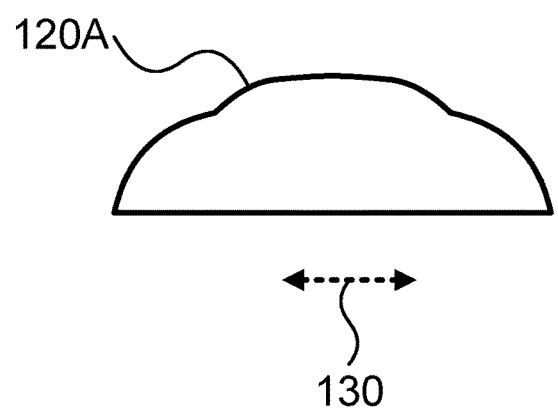
Figure 1B:
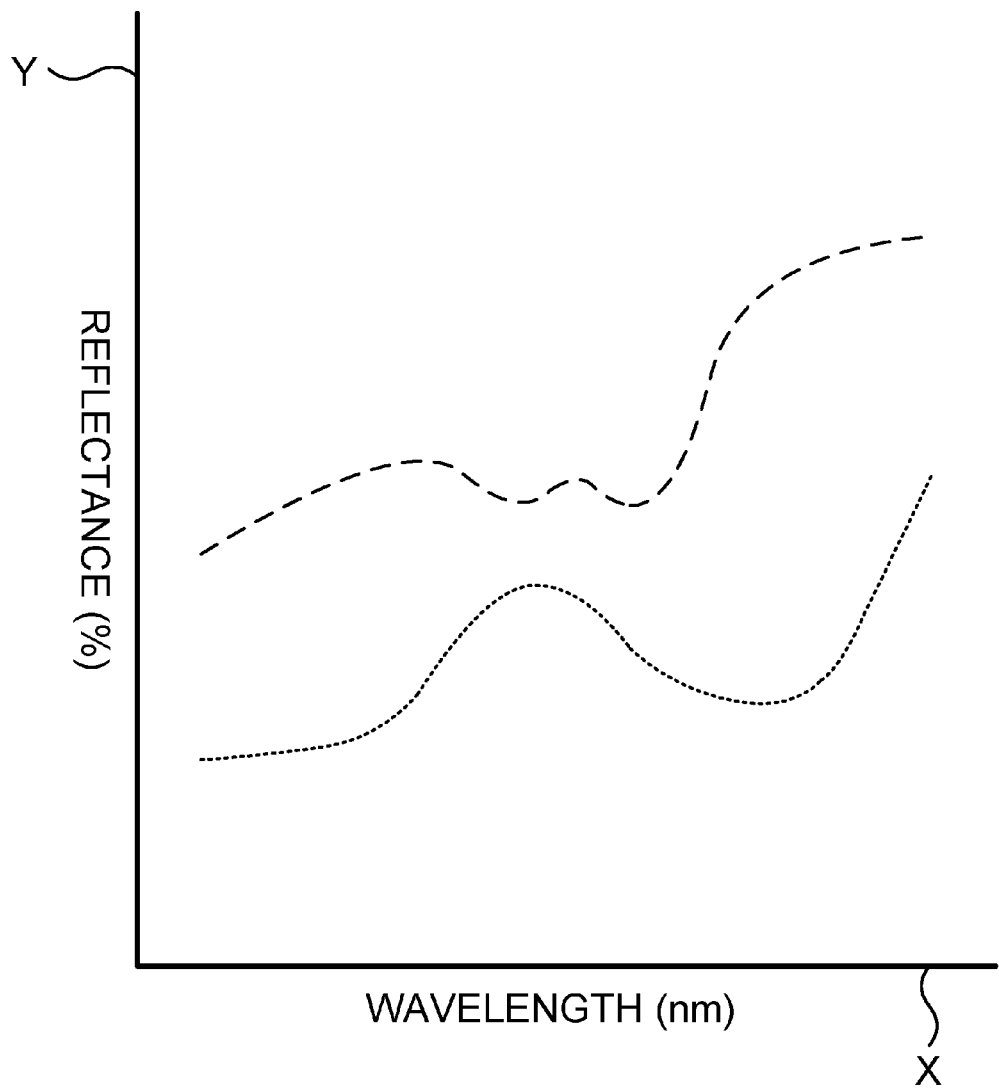
FIG. 1B is a simplified representation of output from the system of FIG. 1A, according to various embodiments.

FIG. 1B illustrates spectrograph 140. Spectrograph 140 can be a graphical representation of data in a spectrographic data set and can be produced using a spectrographic data set. Spectrograph 140 includes wavelength measurements along a horizontal scale X (e.g., x-axis) and reflectance measurements along a vertical scale Y (e.g., y-axis).

Figure 2:
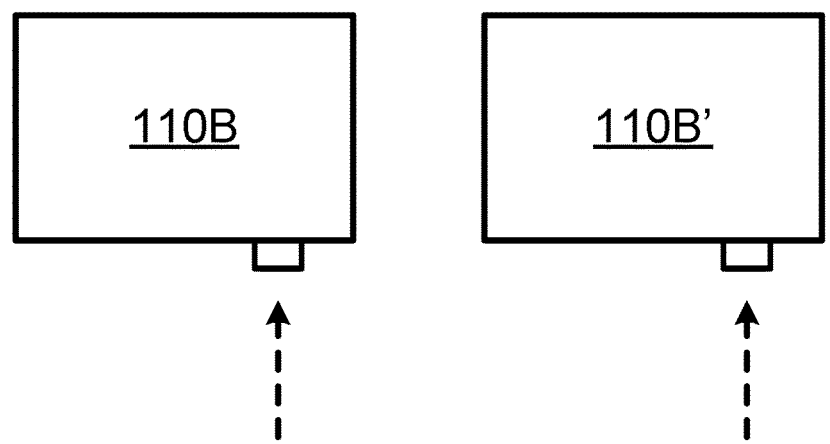
FIG. 2 is a simplified representation of a system for three-dimensional spectroscopy, in accordance with some embodiments.
Figure 2:
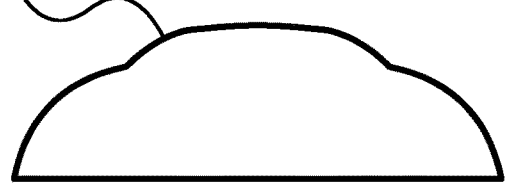

FIG. 2 depicts system 200 for spectral imaging. System 200 can be a linear stage. System 200 includes spectrometer 110E and object 120B. In some embodiments, object 120B includes at least some of the characteristics described above for object 120A (FIG. 1A). To create a three-dimensional spectrograph of object 120B, spectrometer 110E moves at a predetermined rate and direction 230 in a two-dimensional plane. For example, spectrometer 110E is at a location shown for spectrometer 110E at a first time and spectrometer 110E is at a location shown for spectrometer 110B' at a second time. In various embodiments, spectrometer 110E includes at least some of the characteristics described above for spectrometer 110E (FIG. 1A). For example, spectrometer 110E produces a series of spectrographs (the resulting series of spectrographs referred to as a three-dimensional spectrograph) of object 120B, taken as spectrometer 110E moves at a predetermined rate and direction 130 in a two-dimensional plane.

Figure 3A:
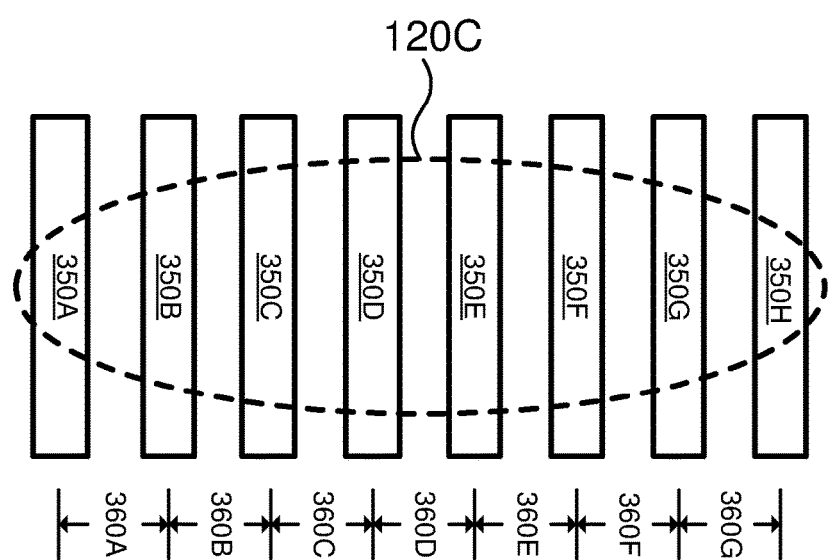
FIGS. 3A and 3B are simplified illustrations of where measurements are taken and a series of spectrographs, in accordance with various embodiments.

FIG. 3A illustrates a spatial relationship 300A of a series of positions (or locations) 350A-350H over object 120C where a series of respective spectrographs are taken using the system 100 (FIG. 1A) and/or system 200 (FIG. 2). Since movement of object 120A relative to spectrometer 110A (FIG. 1A) and/or movement of spectrometer 110B relative to object 120B (FIG. 2) is predetermined and consistent, series of positions 350A-350H is spatially regular. For example, intervals (or distances) 360A-360G between each of positions 350A-350H and an adjacent position is predetermined and substantially the same. In some embodiments, intervals 360A-360G are small, such that series of positions 350A-350H are mostly contiguous. In various embodiments, intervals 360A-360G are negative, such that series of positions 350A-350H overlap.

Figure 3B:
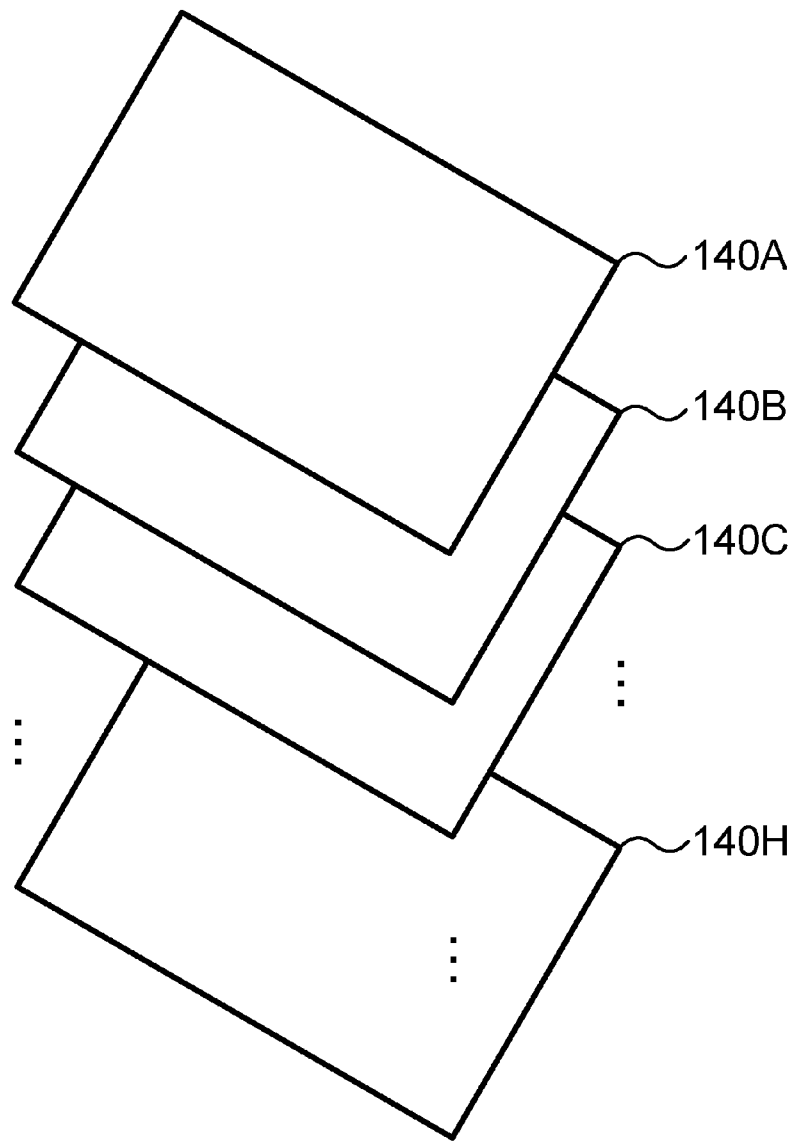

FIG. 3B shows a series 300B of spectrographs 140A-140H taken at positions 350A-350H (FIG. 3A), respectively. A spatial relationship between each of spectrographs 140A-140H can be predetermined, for example, since each of intervals 360A-360G is predetermined and substantially the same as the others of interval 360A-360G. Additionally or alternatively, a position (or location) (e.g., positions 350A-350H) on object 120C from which one of spectrographs 140A-140H was taken can be determined. Accordingly, where on object 120C a particular one of spectrographs 140A-140H applies (e.g., measures or is associated with) can be determined. Series 300B of spectrographs 140A-140H may be referred to as a three-dimensional spectrograph. In some embodiments, spectrographs 140A-140H each include at least some of the characteristics described above for spectrograph 140 (FIG. 1B).

Figure 4:
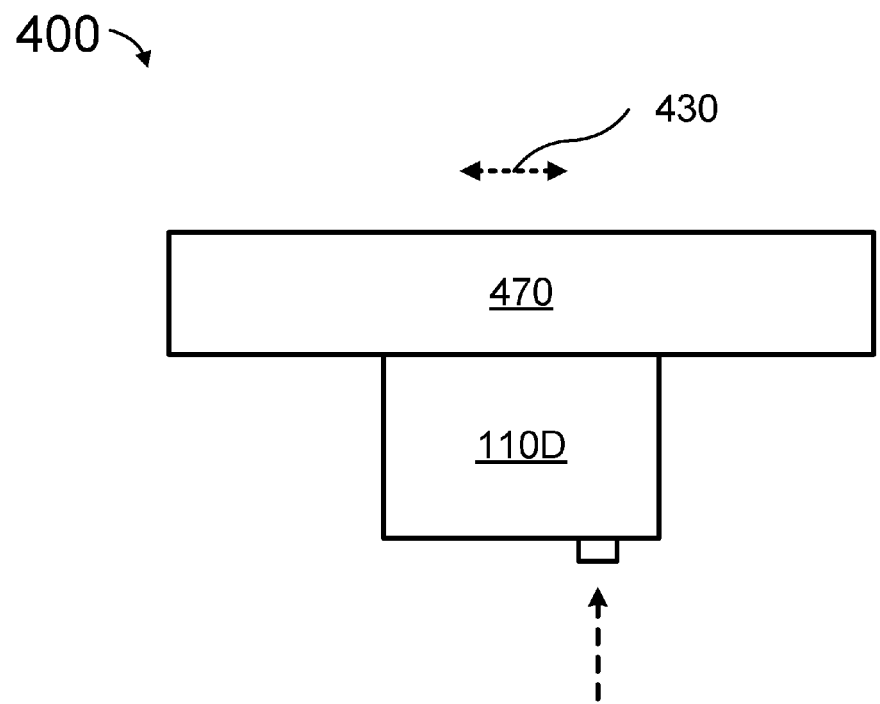
FIG. 4 is a simplified representation of another system for three-dimensional spectroscopy, according to some embodiments.
Figure 4:

FIG. 4 depicts system 400 for three-dimensional spectral imaging. System 400 includes vehicle 470, spectrometer 110D, and object 120D. Object 120D can include a geography (e.g., an area of land). In some embodiments, spectrometer 110D includes at least some of the characteristics described above for spectrometer 110A (FIG. 1A). Spectrometer 110D can be fully or partially, directly or by means of gimbal 430, attached to, mounted on and/or disposed in vehicle 470. For example, gimbal 430 is a pivoted support that allows rotation of spectrometer 110D about a single axis.

In some embodiments, vehicle 470 can be a manned aircraft or unmanned aerial vehicle (UAV). A UAV—also known as a drone, an unmanned aircraft system (UAS), and the like—is an aircraft without a human pilot aboard. In various embodiments, vehicle 470 is one or more of a sea, air, and land vehicle. Vehicle 470 may be operated from within vehicle 470 or under remote control by a human operator, or fully or intermittently autonomously, by onboard computers. By way of non-limiting example, vehicle 470 can be an airplane; sea plane, helicopter; multi-rotor such as a tricopter, quadcopter, hexecopter, Y6, octocopter, X8, etc; a two-wheeled, three-wheeled, four-wheeled, six-wheeled, eight-wheeled, and continuous track (also called tank tread and caterpillar track) vehicle; an amphibious vehicle; watercraft (e.g., ships, boats, hovercraft, etc.), and the like. Other forms of vehicle 470 can be used. For example, a table, lab bench, or other planar surface having a liner stage (e.g., system 200 in FIG. 2), tripod with a pan-tilt stage, and the like can be used.

To create a three-dimensional spectrograph of object 120D, spectrometer 110D moves with vehicle 470. For example, spectrometer 110D produces a series of spectrographs (the resulting series of spectrographs can be referred to as a three-dimensional spectrograph) of object 120D, taken as spectrometer 110D moves at a variable rate and direction. Vehicle 470 from one moment to the next (e.g., at an interval in a range from 1 ns to 30 minutes) can have at least one of a different speed, pitch, yaw, and roll. Since vehicle 470 and spectrometer 110D do not move in a constant and/or predetermined manner, a spatial relationship among each spectrograph in a series of spectrographs is indeterminate. In some embodiments, vehicle 470 includes a global positioning system (GPS) and an inertial measurement unit (IMU) (not depicted in FIG. 4), but the GPS/IMU resolution/accuracy may not be sufficiently granular to accurately determine a spatial relationship among each spectrograph in a series of spectrographs.

Figure 5:
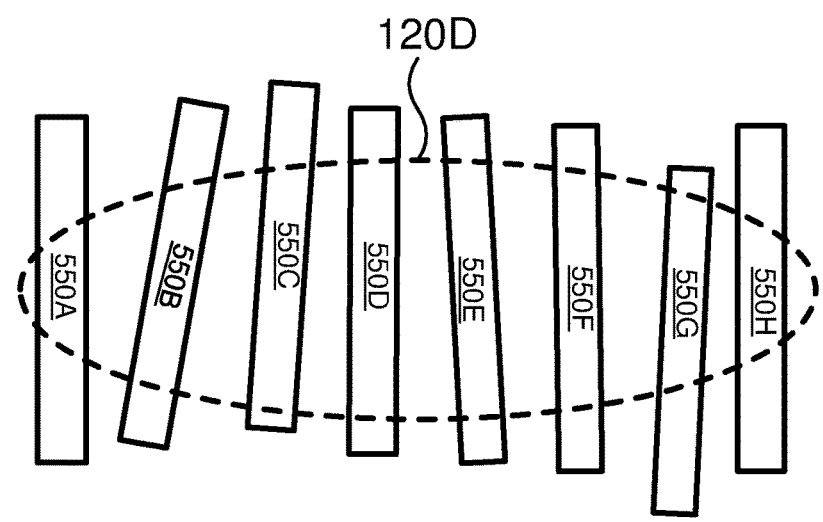
FIG. 5 is a simplified illustration of measurements taken by the system of FIG. 4, according to various embodiments.

FIG. 5 illustrates a spatial dispersion 500 of a series of positions (or locations) over object 120D, where a series of respective spectrographs 550A-550H can be taken using system 400 (FIG. 4). Since movement of spectrometer 110D relative to object 120D may be (constantly) changing/variable, series of spectrographs 550A-550H may be spatially irregular and/or intermittent. Although series of spectrographs 550A-550H are depicted space apart, at least some of spectrographs 550A-550H can at least partially overlap.

Figure 6:
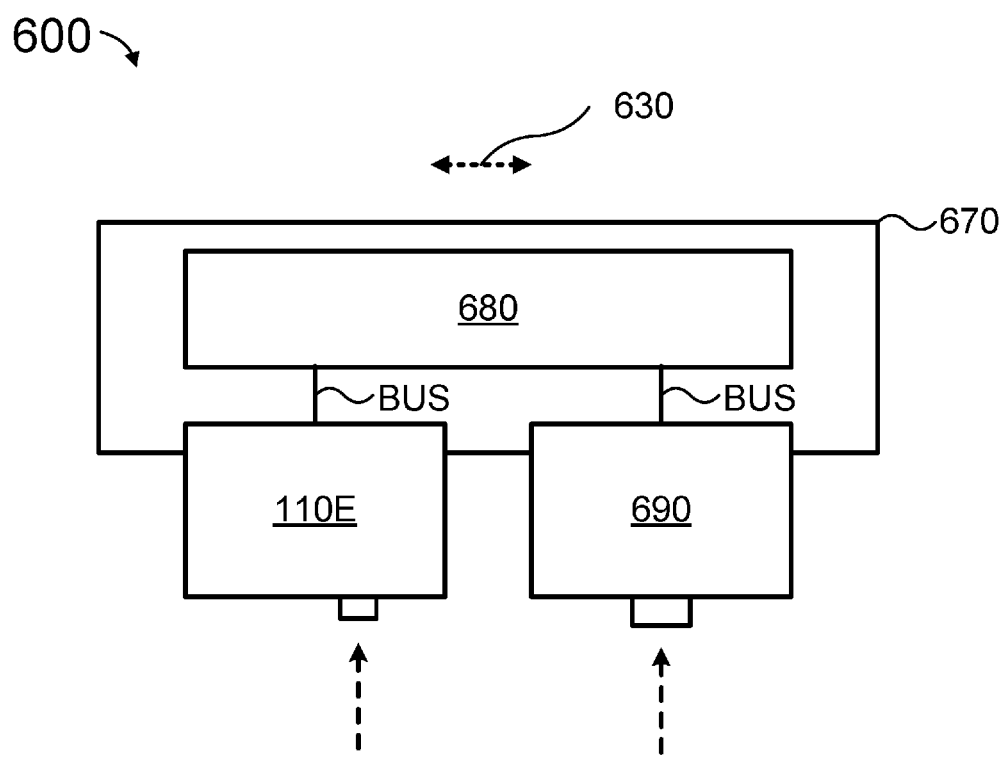
FIG. 6 is a simplified representation of a further system for three-dimensional spectroscopy, in accordance with some embodiments.
Figure 6:

FIG. 6 depicts system 600 for three-dimensional spectral imaging. System 600 includes spectrometer 110E, vehicle 670, computing system 680, camera 690, and object 120E. In some embodiments, spectrometer 110E includes at least some of the characteristics described above for spectrometer 110B (FIG. 1A). Spectrometer 110E can be light weight for use with vehicle 670. Additionally or alternatively, spectrometer 110E can have low power consumption (e.g., receiving power from a (light weight) battery during operation). Spectrometer 110E can be fully or partially, directly or by means of gimbal 630, attached to, mounted on, and/or disposed in vehicle 670. In various embodiments, vehicle 670 includes at least some of the characteristics described above for vehicle 470 (FIG. 4). For example, gimbal 630 is a pivoted support that allows rotation of spectrometer 110E about a single axis. Computing system 680 is described further below in relation to FIG. 9.

In various embodiments, camera 690 is an optical instrument for capturing images. For example, camera 690 is a digital camera which encodes digital images. Digital images can be processed (e.g., filtered) and/or compressed. Digital images can be in a raw image format (e.g., ISO 12234-2 also known as TIFF or EP), Tagged Image File Format (TIFF which can also support non-raw/processed images), JPEG (e.g., ISO/IEC 10918), exchangeable image file format (exif), Graphics Interchange Format (GIF), bitmap (bmp), Portable Network Graphics (PNG), WebP, High Efficiency Image File Format (HEIF), vector formats, and the like. By way of further example, camera 690 can include at least one of a charge-coupled device (CCD) and/or complementary metal oxide semiconductor (CMOS) sensor, lens, and/or shutter. In various embodiments, the lens has a focal length between 8 mm to 200 mm. Camera 690 can be light weight for use with vehicle 670. Additionally or alternatively, camera 690 can have low power consumption (e.g., receiving power from a (light weight) battery during operation).

Camera 690 can be fully or partially, directly or by means of a gimbal, attached to, mounted on, and/or disposed in vehicle 670. For example, a gimbal is a pivoted support that allows rotation of camera 690 about a single axis. In some embodiments, camera 690 and spectrometer 110E are coupled to the same or different gimbals. By way of non-limiting example, images captured by camera 690 and measurements taken by spectrometer 110E are input to computing system 680 using a separate or common/shared bus BUS or other input port of computing system 680. By way of further non-limiting example, images captured by camera 690 and measurements taken by spectrometer 110E are stored (e.g., in a built-in memory 920, a removable mass storage medium 930, portable storage 940, and combinations thereof depicted in FIG. 9) for later processing (e.g., offline and/or batch) by another computing system (e.g., outside of vehicle 670).

Camera 690 can be operated such that camera 690 captures a series of images that overlap (e.g., an image will include at least (different) portions of the immediately preceding and/or following images). For example, an image will overlap at least 10% with the immediately preceding and/or following images. In some embodiments an image will overlap at least 20% with the immediately preceding and/or following images. In various embodiments an image will overlap at least 50% with the immediately preceding and/or following images. For each spectrograph taken by spectrometer 110E there can be a corresponding image captured by camera 690 (and vice-versa). In various embodiments, spectrometer 110E and camera 690 are synchronized (e.g., take measurements and pictures (respectively) at substantially the same time (e.g., around ±5 ms or less)). For example, computing system 680 controls/activates spectrometer 110E and camera 690, such that the measurements and pictures (respectively) are taken at substantially the same time (e.g., around ±5 ms or less). Alternatively or additionally, spectrometer 110E and camera 690 take measurements and pictures (respectively) at a minimum of 10 frames per second.

In some embodiments, spectrometer 110E and camera 690 are arranged in and/or on vehicle 670, such that there is a (predetermined) spatial relationship between an image captured by camera 690 and a spectrograph taken by spectrometer 110E. For example, spectrometer 110E and camera 690 experience a common movement of translation, rotation, tilting, and panning. By way of further example, spectrometer 110E and camera 690 point in the same direction, (preferably) arranged in a co-center way using a dichroic beam splitter by a certain power ratio and/or wavelength range, one or multiple mirrors, and the like, such that spectrometer 110E and camera 690 have the same field of view or there is at least some overlapping field of view. In various embodiments, a spectrograph is taken by spectrometer 110E at a (particular) location in an image captured by camera 690. Spatial relationships between spectrographs taken by spectrometer 110E may be determined from spatial relationships between images captured by camera 690.

Figure 7:
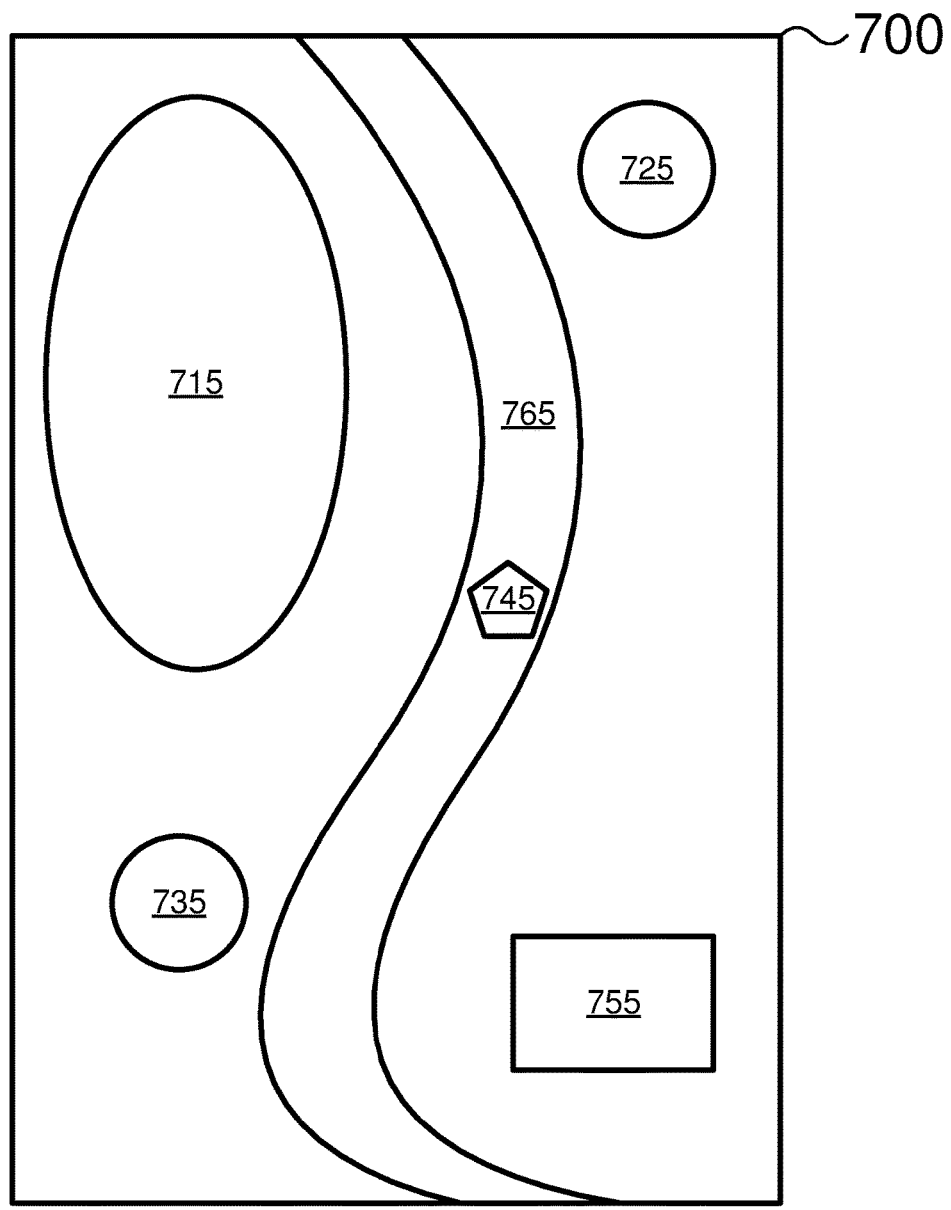
FIG. 7 is a simplified illustration of a geography, in accordance with various embodiments.

FIG. 7 illustrates a simplified geography 700 of object 120D (FIG. 4) and/or object 120E (FIG. 6) which may be captured by camera 690 (FIG. 6). Geography 700 can include features such as hill/mountain 715, boulder 725, tree 735, moving object 745, building/structure 755, and road/ river 765. While features such as hill/mountain 715, boulder 725, tree 735, building/structure 755, and road/river 765 have approximately constant locations relative to each other from one image to the next, moving object 745 can have a different location relative to the other features. While simplified geography 700 is shown from an aerial view (also called a top down view and a bird's eye view), other perspectives can be used. For example, simplified geography can be from a land- or sea-based view (also called a terrestrial view and a street view).

Figure 8:
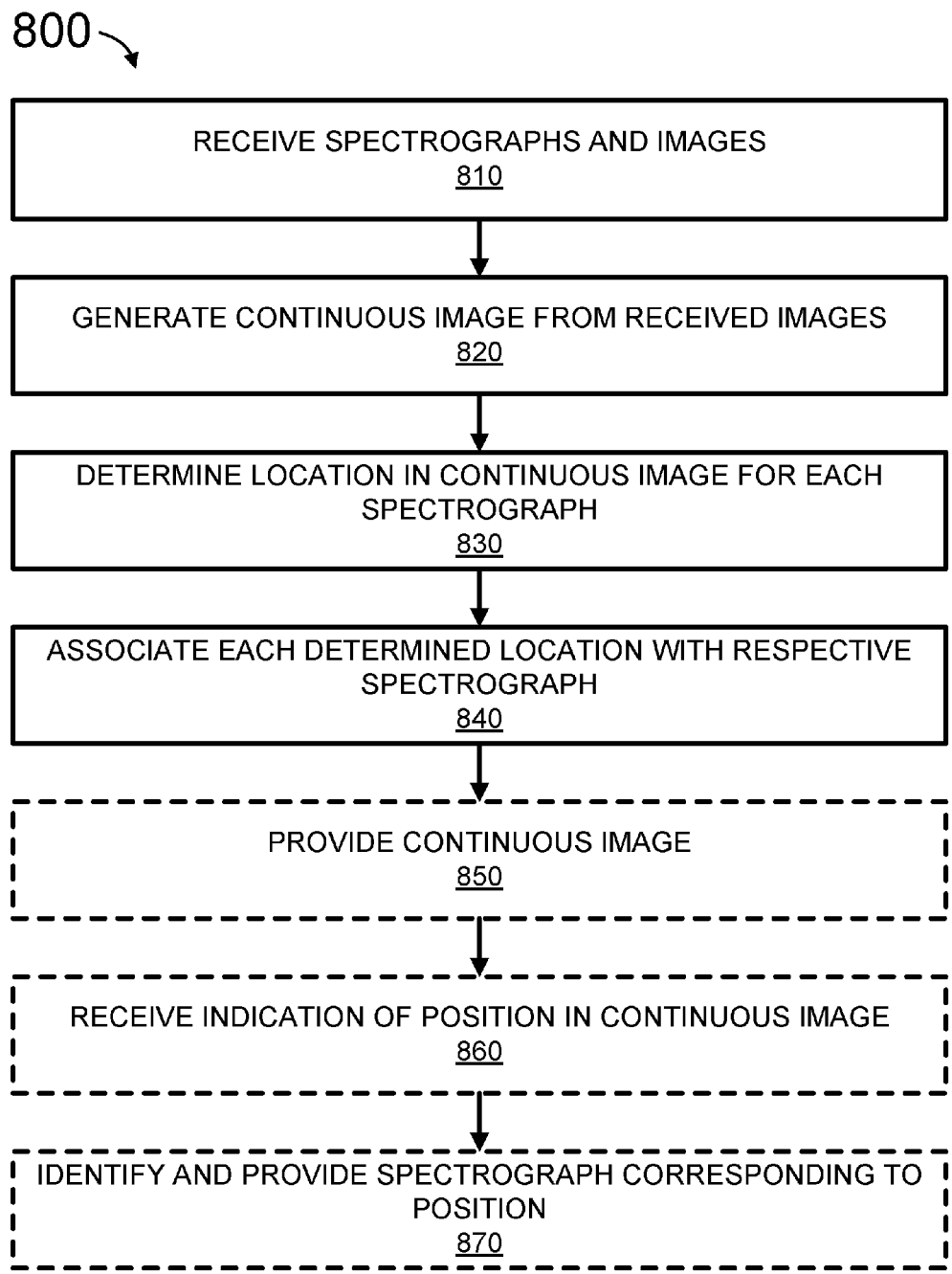
FIG. 8 is a simplified block diagram of a method for three-dimensional spectroscopy, according to some embodiments.

FIG. 8 shows a method 800 from determining spatial relationships among spectrographs taken by the system of FIG. 7. In some embodiments, method 800 is performed by a computing system, such as computing system 680 in vehicle 470 (FIG. 6), in real time. In various embodiments, computing system 680 stores images and corresponding spectrographs, and method 800 is performed by a different computing system in an off-line manner. Method 800 commences at step 810, where a series (e.g., at least two) of spectrographs (and/or spectrographic data sets) and corresponding images are received.

At step 820, the series of images are "stitched" together to form one continuous image (e.g., a "panorama") and a spatial location of each image in the series of images in the continuous image is stored. For example, two or more overlapping images are mapped to one image plane. In some embodiments, global feature matching is used. Generally, the relative position and orientation of the two overlapping images are not known, so key points (e.g., features described in relation to FIG. 7) are identified in both images. The key points in both images are matched to determine a correspondence (sometimes referred to as global feature matching). The correspondence can be used to determine a transformation that maps points in one image to the other image.

A common coordinate system can be established and the two images merged and rendered in the common coordinate system. For example, the common coordinate system is one or more of a Cartesian coordinate system (e.g., an x, y coordinate system having an origin in a predetermined location of the continuous image), polar coordinate system, cylindrical coordinate system, spherical coordinate system, homogeneous coordinate system, and other coordinate systems. Image noise (e.g., moving object 745 of FIG. 7) and compression artifacts may be removed. The above techniques can be (consecutively) applied to more than two images to form the continuous image. A location (e.g., (range of) coordinates in the common coordinate system) of each image in the continuous image is stored.

At step 830, a location in the continuous image associated with a spectrograph (and/or spectrographic data set) in the series of spectrographs (and/or spectrographic data set) is determined, using the location of the image (corresponding to the spectrograph) in the continuous image. In some embodiments, a location of each spectrograph (and/or spectrographic data set) in a corresponding image (from the series of images) can be determined, since there is a (predetermined) spatial relationship between an image captured by camera 690 and a spectrograph taken by spectrometer 110E (FIG. 6). The determined location is where (in geography 700 shown in FIG. 7) spectrometer took measurements in the respective spectrograph (and/or spectrographic data set).

At step 840, a respective determined location for each spectrograph (and/or spectrographic data set) is stored. By way of non-limiting example, each respective location is stored with the corresponding spectrograph (and/or spectrographic data set). By way of further example, an index or table is stored such that the location and its associated spectrograph (and/or spectrographic data set) (e.g., file name of the spectrograph and/or spectrographic data set) are stored in a row/record. In various embodiments, spectrographs (e.g. spectrograph 140 of FIG. 1) are generated using the spectrographic data sets.

Figure 9:
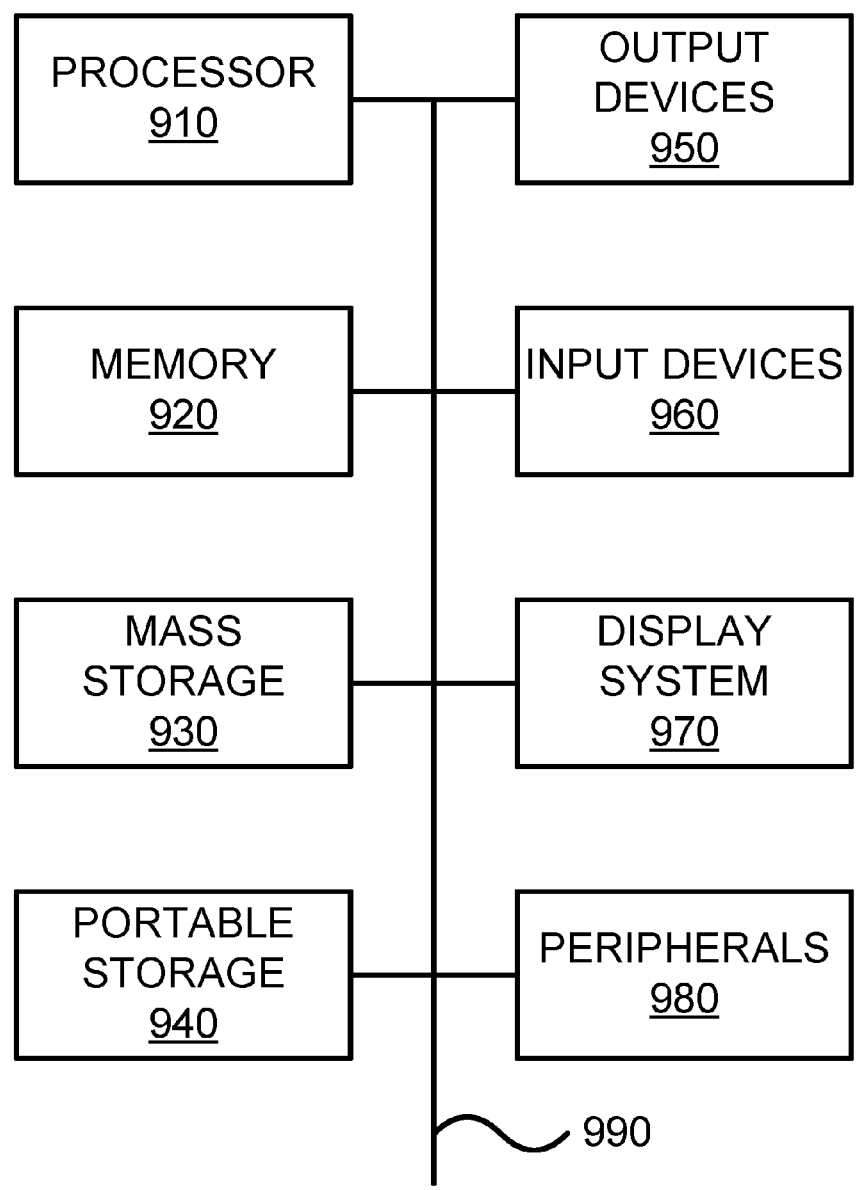
FIG. 9 is a simplified block diagram of a computing system, according to various embodiments.

Optionally at step 850, the continuous image can be provided (e.g., displayed on a display system described further in relation to FIG. 9) to a user.

Optionally at step 860, an indication of a particular point or area in the continuous image is received from the user. For example, the user can indicate the particular area by moving a cursor/pointer over the area on the provided image using a mouse, touch pad, pointing stick, touch pad, joystick, and the like, and providing an input using a mouse button, touch screen, keyboard, and the like.

Optionally at step 870, a spectrograph associated with the point or area received from the user is determined using the determined locations. For example, a coordinate of the indicated point or area is determined and used to identify a spectrograph corresponding to the determined coordinates.

Optionally at step 870, the determined spectrograph is provided (e.g., displayed on a display system described further in relation to FIG. 9) to the user.

FIG. 9 illustrates an exemplary computer system 900 (also referred to herein as computing system 900) that may be used to implement some embodiments of the present invention. The computer system 900 in FIG. 9 may be implemented in the contexts of the likes of computing systems, networks, servers, or combinations thereof. The computer system 900 in FIG. 9 includes one or more processor unit(s) 910 and main memory 920. Main memory 920 stores, in part, instructions and data for execution by processor unit(s) 910. Main memory 920 stores the executable code when in operation, in this example. The computer system 900 in FIG. 9 further includes a mass data storage 930, portable storage device 940, output devices 950, user input devices 960, a graphics display system 970, and peripheral device(s) 980 (also referred to herein as peripherals 980).

The components shown in FIG. 9 are depicted as being connected via a single bus 990. The components may be connected through one or more data transport means. Processor unit(s) 910 and main memory 920 are connected via a local microprocessor bus, and the mass data storage 930, peripheral device(s) 980, portable storage device 940, and graphics display system 970 are connected via one or more input/output (I/O) buses.

Mass data storage 930, which can be implemented with a magnetic disk drive, solid state drive, or an optical disk drive, is a non-volatile storage device for storing data and instructions for use by processor unit(s) 910. Mass data storage 930 stores the system software for implementing embodiments of the present disclosure for purposes of loading that software into main memory 920.

Portable storage device 940 operates in conjunction with a portable non-volatile storage medium, such as a flash drive, floppy disk, compact disk, digital video disc, or Universal Serial Bus (USB) storage device, to input and output data and code to and from the computer system 900 in FIG. 9. The system software for implementing embodiments of the present disclosure is stored on such a portable medium and input to the computer system 900 via the portable storage device 940.

User input devices 960 can provide a portion of a user interface. User input devices 960 may include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 as shown in FIG. 9 includes output devices 950. Suitable output devices 950 include speakers, printers, network interfaces, and monitors.

Graphics display system 970 include a liquid crystal display (LCD) or other suitable display device. Graphics display system 970 is configurable to receive textual and graphical information and processes the information for output to the display device.

Peripheral device(s) 980 may include any type of computer support device to add additional functionality to the computer system.

The components provided in the computer system 900 in FIG. 9 are those typically found in computer systems that may be suitable for use with embodiments of the present disclosure and are intended to represent a broad category of such computer components that are well known in the art. Thus, the computer system 900 in FIG. 9 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX, ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 900 may be implemented as a cloud-based computing environment, such as a virtual machine operating within a computing cloud. In other embodiments, the computing system 900 may itself include a cloud-based computing environment, where the functionalities of the computing system 900 are executed in a distributed fashion. Thus, the computing system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 600, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of wired and/or wireless network, including a (wireless) local area network (LAN/WLAN) or a (wireless) wide area network (WAN/WWAN), or the connection may be made to an external computer (for example, through the Internet using an Internet Service Provider, wireless Internet provider, and the like).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Figure 10:
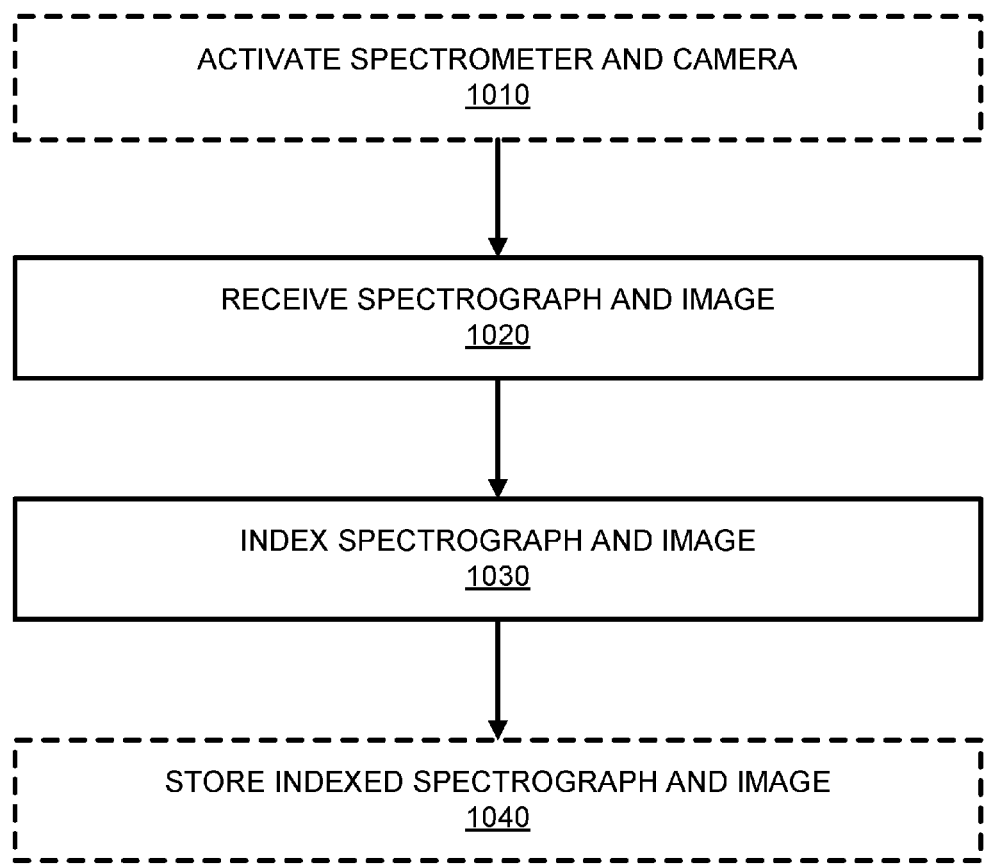
FIG. 10 is a simplified block diagram of a method for associating, according to some embodiments.

FIG. 10 shows a method 1000 for associating spectrographs and images taken by, for example, the system of FIG. 6. In some embodiments, at least some of method 1000 is performed by a computing system, such as computing system 680 in vehicle 470 (FIG. 6), in real time. In various embodiments, at least some of method 1000 is performed by a computing system (e.g., computer system 900 in FIG. 9) in an off-line manner. Method 1000 commences (optionally) at step 1010, where a camera (e.g., camera 690) and spectrometer (e.g., spectrometer 110E) are triggered to take an image and a spectrograph/spectrographic data set, respectively, at substantially the same time (e.g., ±5 ms or less).

Alternatively or additionally, the camera and spectrometer are triggered to take a series of images and corresponding spectrograph/spectrographic data sets, respectively, at substantially the same time and at a predetermined interval. For example, the predetermined interval can be 0.01 second to 10 minutes. Alternatively or additionally, the camera and spectrometer are triggered to take a series of images and corresponding spectrograph/spectrographic data sets, respectively, for a predetermined amount of time and/or a predetermined number of images and corresponding spectrograph/spectrographic data sets. For example, the predetermined amount of time is 0.5 seconds to 1 hour and the predetermined number of images is 2 to 1,000.

According to some embodiments, the camera and spectrometer can be triggered by the computing system (e.g., computing system 680 in FIG. 6) over bus (e.g., BUS in FIG. 6), and/or a separate wired and/or wireless connection. By way of non-limiting example, the camera can include a remote shutter release, which may be activated over the bus, a separate wired connection (e.g., shutter release cable), and a wireless connection (e.g., radio frequency signal, such as 3 kHz to 300 GHz), the like, and combinations thereof. By way of further non-limiting example, the spectrometer can include a remote triggering mechanism, which may be activated over bus BUS, a separate wired connection, and a wireless connection (e.g., radio frequency signal, such as 3 kHz to 300 GHz), the like, and combinations thereof.

In various embodiments, a time at which the camera is triggered and the time at which the spectrometer is triggered may be offset to compensate for different latencies through the two triggering mediums. The different latencies through the two triggering mechanisms can arise, for example, due to the camera and the spectrometer being different distances away from the computing system, different triggering mediums (e.g., bus BUS, separate wired connection, radio frequency signal, and the like), etc.

At step 1020, an image and a spectrograph/spectrographic data set can be received from the camera and spectrometer, respectively. In some embodiments, the image and the spectrograph/spectrographic data set are each one in a series of images and spectrographs/spectrographic data sets, respectively. For example, the image can be a digital image in a raw image format (e.g., ISO 12234-2 also known as TIFF or EP), Tagged Image File Format (TIFF which can also support non-raw/processed images), JPEG (e.g., ISO/IEC 10918), exchangeable image file format (exif), Graphics Interchange Format (GIF), bitmap (bmp), Portable Network Graphics (PNG), WebP, High Efficiency Image File Format (HEIF), vector formats, and the like. In some embodiments, the image and the spectrograph/spectrographic data set are received over one or more busses BUS.

At step 1030, the image and the spectrograph/spectrographic data set are indexed (e.g., each image and (corresponding) spectrograph/spectrographic data set captured at substantially the same time are associated with each other using an index). By way of example and not limitation, a file name of the image and a file name of the (corresponding) spectrograph/spectrographic data set are recorded in a (row or column of a) table along with an index. By way of additional example, the index can be included in the file name of the image and the file name of the spectrograph/spectrographic data set. By way of further example, the index can be inserted into the image and the spectrograph/spectrographic data as metadata.

In some embodiments, the metadata is in the Information Interchange Model (IIM), International Press Telecommunications Council (IPTC), Extensible Metadata Platform (XMP), Exchangeable image file format (Exif), the like, and combinations thereof. The above examples may be used singly and in various combinations. In various embodiments, the metadata is in addition to and/or in place of metadata already present in the image and/or the spectrograph/spectrographic data set (created by the camera and/or spectrometer, respectively). By way of non-limiting example, the camera may include in the captured image the brand of the camera, the model of the camera, exposure information (e.g., shutter speed, f-stop, etc.), the like, and combinations thereof.

In some embodiments, the index can be a time stamp (e.g., date and/or time), a consecutive sequence (e.g., of ascending/descending numbers and alphanumeric characters), GPS coordinates (e.g., a GPS (not shown in FIG. 6) can be coupled to a computing system (e.g., computing system 680) over a bus (e.g., BUS), the like, and combinations thereof.

According to various embodiments, the index can be created using information produced by the camera and spectrometer and included in the image and/or spectrograph/spectrographic data set. For example, the information can be a file name and/or metadata, such as a time stamp (e.g., date and/or time), a consecutive sequence (e.g., of ascending/descending numbers and alphanumeric characters), GPS coordinates (e.g., a GPS (not shown in FIG. 6) can be coupled to camera 690 and/or spectrometer 110E such as through computing system 680 over bus BUS), the like, and combinations thereof. Indexing can include using the information (produced by the camera and spectrometer and included in the image and/or spectrograph/spectrographic data set) to create a table, rename image and/or spectrograph/spectrographic data set file names, add/replace metadata, the like, and combinations thereof. For example, a time stamp is used to rename (e.g., create a different file name) the image and/or spectrograph/spectrographic data set. By way of further non-limiting example, file names for the image and/or spectrograph/spectrographic data set are used to identify the image and/or spectrograph/spectrographic data set and associate them in a table to an index.

Optionally at step 1040, the indexed image and spectrograph/spectrographic data set can be stored. For example, the indexed image and spectrograph/spectrographic data set can be stored in a mass storage 930 and/or portable storage 940 (FIG. 9.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

We claim:

1. A system for adjusting for irregular movement during spectral imaging comprising:
    a spectrometer measuring a plurality of spectrographic data sets;
    a camera capturing images, the camera being coupled to the spectrometer such that the spectrometer and the camera move in tandem and at least partially share the same point of view, the spectrometer and the camera being synchronized;
    a processor communicatively coupled to the spectrometer and the camera; and
    a memory coupled to the processor, the memory storing instructions executable by the processor to perform a method comprising:
        receiving a plurality of spectrographs for a series of respective locations and the images corresponding to the respective locations, each spectrograph of the plurality of spectrographs being produced using a spectrographic data set of the plurality of spectrographic data sets, each of the plurality of spectrographic data sets being measured by the spectrometer and each of the corresponding images being captured by the camera at substantially the same time;
        generating a continuous image using the images;
        identifying a respective corresponding position in the continuous image for the each spectrograph, such that the each spectrograph is a measurement of the respective position; and
        associating the each spectrograph with the respective position.

2. The system of claim 1, wherein the spectrometer and the camera are disposed in a vehicle such that the spectrometer and the camera point in the same direction, the vehicle being in motion when at least some of the spectrographic data sets and the corresponding images are captured.

3. The system of claim 1, wherein the method further comprises:
    getting the plurality of spectrographic data sets;
    creating the each spectrograph using a respective spectrographic data set of the plurality of spectrographic data sets; and
    associating the each spectrograph with the position associated with the respective spectrographic data set.

4. The system of claim 1, wherein the method further comprises:
    providing the continuous image to a user;
    getting an indication from the user of a particular position in the continuous image; and
    determining and providing a spectrograph associated with the particular position.

5. The system of claim 1, wherein the generating the continuous image includes global feature matching among the images and assigning coordinates to each of the images using a coordinate system.

6. The system of claim 5, wherein the identifying the respective corresponding position for the each spectrograph uses the coordinates assigned to the corresponding image.

7. The system of claim 1, wherein the spectrometer measures wavelengths in at least one of the visible spectrum, visible to near-infrared, short-wave infrared, and infrared.

8. The system of claim 1, wherein the each of the corresponding images is taken from a different place than an adjacent image of the corresponding images.

9. The system of claim 8, wherein the each of the corresponding images overlaps with the adjacent image of the corresponding images by at least 20%.

10. The system of claim 1, wherein the camera is a digital camera having a lens, the lens having a focal length in the range of 8 mm to 200 mm.

11. A system for compensating for irregular motion in three-dimensional spectroscopy comprising:
- a spectrometer measuring a plurality of spectrographic data sets;
- a camera capturing images, the camera being coupled to the spectrometer such that the spectrometer and the camera move in tandem and at least partially share the same point of view, the spectrometer and the camera being synchronized;
- a processor communicatively coupled to the spectrometer and the camera; and
- a memory coupled to the processor, the memory storing instructions executable by the processor to perform a method comprising:
  - receiving the plurality of spectrographic data sets for a series of respective locations and the images corresponding to the respective locations, each of the plurality of spectrographic data sets being measured by the spectrometer and each of the corresponding images being captured by the camera at substantially the same time;
  - generating a continuous image using the received images;
  - identifying a respective corresponding position in the continuous image for each spectrographic data set, such that the each spectrographic data set is a measurement of the respective position; and
  - associating the each spectrographic data set with the respective position.

12. The system of claim 11, wherein the spectrometer and the camera are disposed in a vehicle such that the spectrometer and the camera point in the same direction, the vehicle being in motion when at least some of the spectrographic data sets are measured and the corresponding images are captured.

13. The system of claim 11, wherein the method further comprises:
- creating each spectrograph of a plurality of spectrographs using a respective spectrographic data set of the plurality of spectrographic data sets; and
- associating the each spectrograph with the position associated with the respective spectrographic data set.

14. The system of claim 13, wherein the method further comprises:
- providing the continuous image to a user;
- getting an indication from the user of a particular position in the continuous image; and
- determining and providing a spectrograph associated with the particular position.

15. The system of claim 11, wherein the generating the continuous image includes global feature matching among the images and assigning coordinates to each of the images using a coordinate system.

16. The system of claim 15, wherein the identifying the respective corresponding position for the each spectrographic data set uses the coordinates assigned to the corresponding image.

17. The system of claim 11, wherein the spectrometer measures wavelengths in at least one of the visible spectrum, visible to near-infrared, short-wave infrared, and infrared.

18. The system of claim 11, wherein the each of the corresponding images is taken from a different place than an adjacent image of the corresponding images.

19. The system of claim 18, wherein the each of the corresponding images overlaps with the adjacent image of the corresponding images by at least 20%.

20. The system of claim 11, wherein the camera is a digital camera having a lens, the lens having a focal length in the range of 8 mm to 200 mm.

* * * * *